US008538645B2

(12) United States Patent
Anderson et al.

(10) Patent No.: US 8,538,645 B2
(45) Date of Patent: Sep. 17, 2013

(54) CONTROL SYSTEM HAVING LOAD-ADJUSTED ECONOMY MODE

(75) Inventors: Randall T. Anderson, Peoria, IL (US); Todd R. Farmer, Apex, NC (US); Neil A. Roth, Germantown Hills, IL (US)

(73) Assignee: Caterpillar Inc., Peoria, IL (US)

( * ) Notice: Subject to any disclaimer, the term of this patent is extended or adjusted under 35 U.S.C. 154(b) by 550 days.

(21) Appl. No.: 12/821,618

(22) Filed: Jun. 23, 2010

(65) Prior Publication Data

US 2011/0320095 A1 Dec. 29, 2011

(51) Int. Cl.
*B60W 10/06* (2006.01)
*B60W 10/10* (2012.01)
*F02D 45/00* (2006.01)

(52) U.S. Cl.
USPC ............... 701/54; 701/102; 701/22; 477/34; 477/11

(58) Field of Classification Search
USPC ................ 701/59, 102, 110, 114, 115
See application file for complete search history.

(56) References Cited

U.S. PATENT DOCUMENTS

| 4,836,056 | A | 6/1989 | Nakawaki et al. |
| 6,157,885 | A | 12/2000 | Sakaguchi et al. |
| 6,937,930 | B2 | 8/2005 | Pirotais |
| 7,292,932 | B1 * | 11/2007 | Ledger et al. ............... 701/110 |
| 7,350,611 | B2 * | 4/2008 | Betz et al. ................. 180/69.3 |
| 2003/0070859 | A1 * | 4/2003 | Dahl et al. ................. 180/305 |
| 2006/0167607 | A1 * | 7/2006 | Nakamura et al. ............. 701/50 |
| 2008/0269011 | A1 * | 10/2008 | Sopko et al. ................. 477/34 |
| 2011/0040458 | A1 * | 2/2011 | Nakagawa et al. ............ 701/50 |

FOREIGN PATENT DOCUMENTS

| WO | 2009082446 | 7/2009 |
| WO | WO2009082446 | 7/2009 |

* cited by examiner

*Primary Examiner* — Fadey Jabr
*Assistant Examiner* — Yazan A Soofi
(74) *Attorney, Agent, or Firm* — Finnegan, Henderson, Farabow, Garrett & Dunner LLP

(57) ABSTRACT

A control system for a mobile machine is disclosed. The control system may have an engine configured to propel the mobile machine, at least one operator input device configured to indicate a desired engine speed and a desired mode of operation, and a controller in communication with the engine and the at least one operator input device. The controller may be configured to make a comparison of a current torque of the engine to an available torque, and to selectively adjust a speed of the engine from the desired engine speed based on the desired mode of operation and based on the comparison.

18 Claims, 3 Drawing Sheets

CONTROL SYSTEM HAVING LOAD-ADJUSTED ECONOMY MODE

TECHNICAL FIELD

The present disclosure relates generally to a control system and, more particularly, to a control system having a load-adjusted economy mode of machine operation.

BACKGROUND

Mobile machines, including bulldozers, wheel loaders, motor graders, and other types of heavy equipment, can be used for a variety of tasks. In order to accomplish these tasks, the machines typically include a primary mover such as an internal combustion engine that is coupled to traction devices of the machine to propel the machine. The primary mover can also be coupled to power one or more work implements attached to the machine.

One type of mobile machine is known as a "high-idle" machine. During operation of a high-idle machine, a speed of the primary mover is generally set to a level that is sufficient to quickly produce a maximum power output that could be required by the traction devices and the work implement. That is, in order to help ensure that the machine has power sufficient to move the machine and work tool under all conditions, the primary mover is set to a predetermined high speed, even if the current task being accomplished by the machine currently demands less power from the primary mover. Although very responsive to changing demands, this high level output may be inefficient in some situations and could result in high fuel consumption, excessive exhaust emissions, elevated temperatures, and high levels of engine noise.

One way to reduce the fuel consumption, exhaust emissions, temperatures, and noise associated with a high-idle machine is disclosed in WO Patent Publication No. 2009/082446 (the '446 publication) of Roth et al. published on Jul. 2, 2009. The '446 publication discloses a high-idle machine having a control system that monitors a travel direction of the machine and selectively adjusts an engine speed of the machine based on the travel direction. In particular, when the control system detects a reverse driving direction of the machine, the control system reduces an engine speed of the machine away from a high-idle speed. When driving in the reverse direction, machine work tools are inactive or have reduced engagement with the earth, thus requiring reduced power from the engine. Accordingly, engine speed can be reduced during reverse travel to improve fuel consumption, emissions, and noise, without significantly affecting a responsiveness of the machine in a negative way.

The disclosed control system is directed to overcoming one or more of the problems set forth above and/or other problems of the prior art.

SUMMARY

In one aspect, the present disclosure is directed to a control system for a mobile machine. The control system may include an engine configured to propel the mobile machine, at least one operator input device configured to indicate a desired engine speed and a desired mode of operation, and a controller in communication with the engine and the at least one operator input device. The controller may be configured to make a comparison of a current torque of the engine to an available torque, and to selectively adjust a speed of the engine from the desired engine speed based on the desired mode of operation and based on the comparison.

In another aspect, the present disclosure is directed to a method of controlling a mobile machine. The method may include receiving input indicative of a desired engine speed of the mobile machine and a desired mode of operation of the mobile machine. The method may also include making a comparison of a current engine torque of the mobile machine to an available torque, and selectively adjusting an engine speed of the mobile machine from the desired engine speed based on the desired mode of operation and based on the comparison.

DETAILED DESCRIPTION

Figure 1:
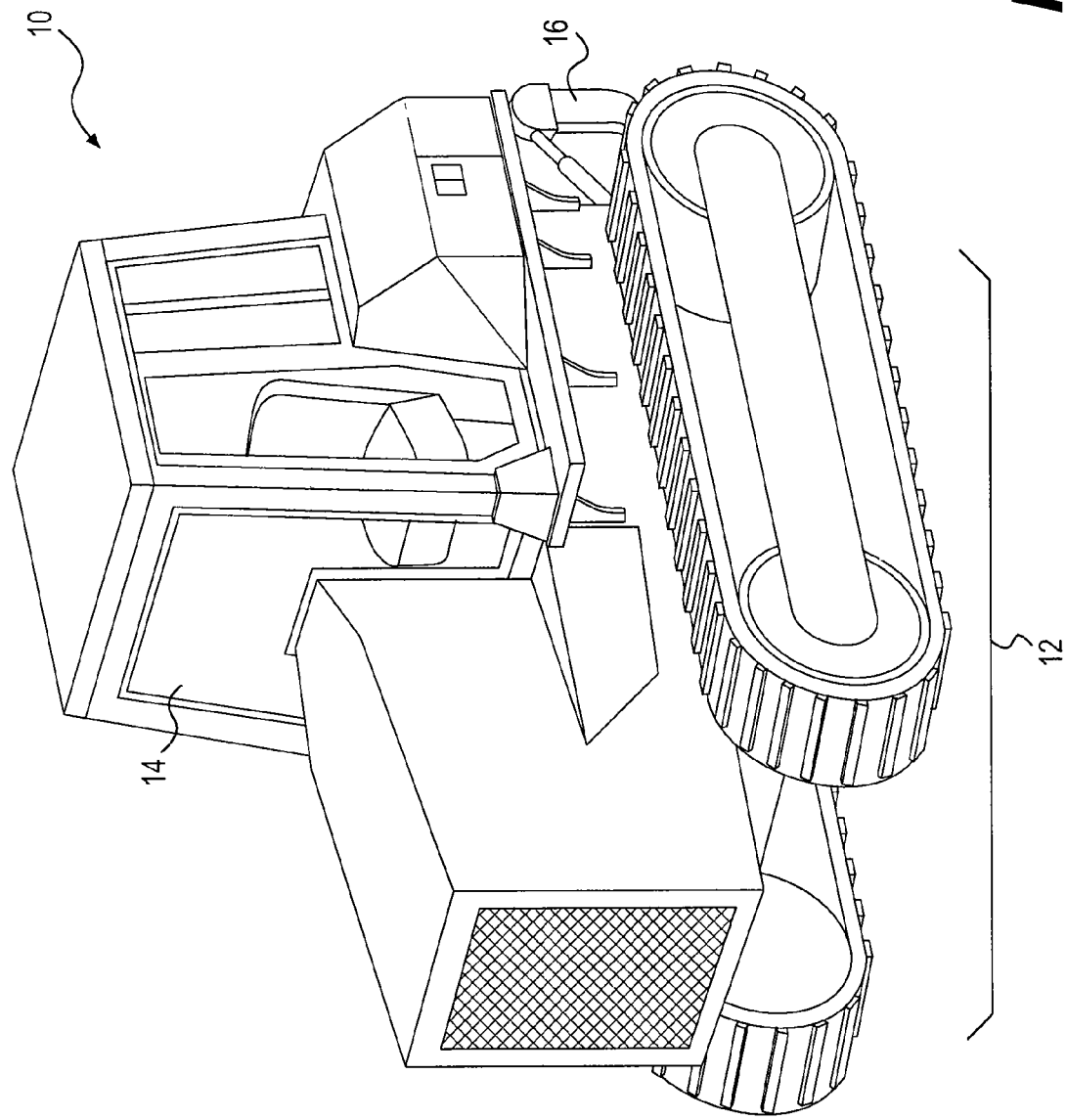
FIG. 1 is a diagrammatic illustration of an exemplary disclosed machine.

FIG. 1 illustrates an exemplary embodiment of a machine 10. Machine 10 may be a mobile machine that performs some type of operation associated with an industry such as mining, construction, farming, or another industry known in the art. For example, machine 10 may be an earth moving machine, such as a dozer, a wheel loader, an excavator, a backhoe, a motor grader, or any other suitable operation-performing machine. Machine 10 may include a powertrain 12, and an operator station 14 used to control powertrain 12. In some embodiments, machine 10 may also include one or more work tools 15 driven by portions of power train 12 and also controlled by operator station 14.

Figure 2:
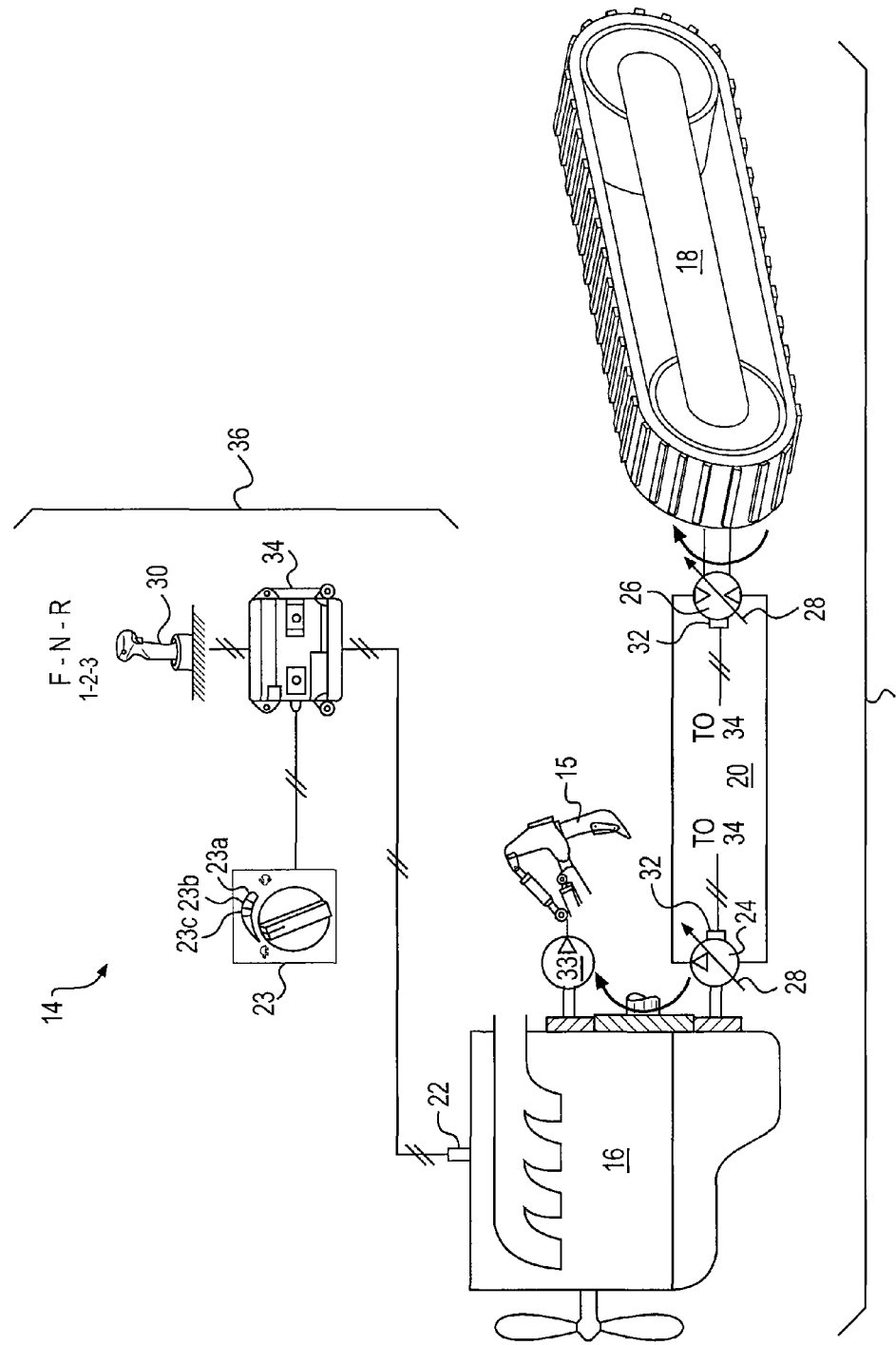
FIG. 2 is a schematic and diagrammatic illustration of an exemplary disclosed power system that may be used with the machine of FIG. 1.

As shown in FIG. 2, powertrain 12 may include an engine 16, at least one traction device 18, and a transmission 20 connected between engine 16 and traction device 18. Engine 16 may combust a mixture of fuel and air to generate a power output including a speed component and a torque component. Transmission 20 may adjust a ratio of the speed and torque components generated by engine 16 that are passed to traction device 18 to propel machine 10 at a desired speed. Engine 16 may also be used to provide power required to operate work tool 15.

Engine 16 may embody a diesel engine, a gasoline engine, a gaseous fuel powered engine (e.g., a natural gas engine), or any other type of combustion engine apparent to one skilled in the art. Engine 16 may produce a power output in accordance with an amount of fuel and air combusted within engine 16. In particular, for a given engine speed and with sufficient air supply, engine 16 may be provided with fuel up to a torque limit amount. When the amount of fuel for the given engine speed is at the torque limit amount, engine 16 may be producing a maximum amount of torque for that speed. When less than the torque limit amount of fuel is being combusted within engine 16, engine 16 may have additional torque output capacity available for use. One or more sensors 22 may be associated with engine 16 and configured to monitor a current engine speed and a current torque of engine 16, and to generate corresponding signals. In one example, the current torque may be monitored by monitoring a current fuel setting of engine 16 that corresponds with the current torque.

Machine 10 may be a high-idle machine. In particular, machine 10 may be designed to operate normally at an elevated engine speed known as high-idle. As load is applied to machine 10, for example by way of work tool 15 and/or traction device 18, machine 10 may lug and the speed of engine 16 may fall away from the elevated engine speed while the torque output of engine 16 is increased. As the load on machine 10 is removed, machine 10 may attempt to recover the high-idle engine speed in anticipation of future loading events. In one embodiment, the high-idle engine speed of machine 10 may be about 2100 rpm.

The desired speed of engine 16 may be set by an operator via an input device 23 located within operator station 14. In one example, input device 23 may be a dial that is movable from a left-most position corresponding to a low-idle speed of about 750 rpm, to a right-most position corresponding to the high-idle speed. Input device 23 may be moved continuously or in discrete steps through a range of motion corresponding to different speeds between low-idle and high-idle. In the example of FIG. 2, input device 23 may have multiple high-idle positions, for example a normal high-idle position 23a, a first economy mode high-idle position 23b, and a second economy mode high-idle position 23c. As will be described in more detail below, engine 16 may be controlled differently depending on the high-idle position of input device 23. The normal high-idle mode may allow standard operation of machine 10. The first and second economy modes may provide improved levels of fuel efficiency, exhaust emissions, engine noise, etc., through selective reductions in engine speed.

Transmission 20 may embody a continuously variable transmission (CVT) having a range of output ratios that is infinitely variable. A CVT generally consists of a driving element, a driven element, and a ratio controller. Transmission 20 is illustrated in FIG. 2 as a hydraulic-type CVT, where the driving element is a pump 24 such as a variable displacement pump, the driven element is a motor 26 such as a variable displacement motor, and the ratio controller consists of variable displacement mechanisms 28 associated with one or both of pump 24 and motor 26. Pump 24 may be driven by engine 16 to pressurize fluid, which may then be directed to motor 26 to rotate motor 26 and thereby drive traction device 18. A displacement of pump 24 and/or motor 26 may be selectively adjusted via displacement mechanisms 28 to thereby adjust a ratio of transmission 20 (i.e., to change a ratio of the speed component vs. the torque component in the power generated by engine 16 that is passed to traction device 18).

Although illustrated as a hydraulic CVT in FIG. 2, it is contemplated that transmission 20 could alternatively embody an electric CVT, if desired. An electric CVT may include a generator, an electric motor that receives current from the generator, and electronic circuitry that functions as the ratio controller to adjust the speed vs. torque ratio in the power output of transmission 20. It is also contemplated that transmission 20 could alternatively embody or additionally incorporate a mechanical step-change transmission, if desired.

Transmission 20 may include a neutral gear ratio, an infinite combination of forward gear ratios, and an infinite combination of reverse gear ratios. Based on signals from an operator input device 30, displacement mechanisms 28 may cause transmission 20 to shift from the neutral gear ratio to any combination of forward or reverse gear ratios. For example, an operator may tilt input device 30 in a direction corresponding with Forward (F), Neutral (N), or Reverse (R) to select the desired travel direction. The operator may then press a button on input device 30 to indicate a desired gear ratio of transmission 20 in the desired travel direction. The desired gear ratio, together with the desired engine speed received by way of input device 23, may at least partially define a desired travel speed of machine 10. It is contemplated that the desired travel direction, gear ratio, and travel speed may be selected in a manner other than described above, if desired. It is also contemplated that operator input device 30 may be used to control additional operations, if desired, such as steering of machine 10 and/or movement of work tool 15.

One or more sensors 32 may be associated with transmission 20 to generate signals indicative of a current gear ratio of transmission 20. Sensors 32 may embody, for example, speed sensors configured to monitor a speed input (e.g., a speed of pump 24) and a speed output (e.g., a speed of motor 26) of transmission 20. Based on the speed input and the speed output, the current gear ratio of transmission 20 may be calculated. It is contemplated that the current gear ratio of transmission 20 may be determined in another manner, if desired, such as by monitoring a displacement of pump 24 and motor 26.

Traction device 18 may convert the rotational motion provided by transmission 20 to a translational motion of machine 10. In the embodiment of FIG. 1, traction device 18 includes tracks located on each side of machine 10. Alternately, traction device 18 may include wheels, belts, or other driven traction devices. Traction device 18 may be driven by transmission 20 to rotate in accordance with an output rotation of motor 26. It is contemplated that a final reduction gear set (not shown) may be situated between motor 26 and traction device 18, if desired.

Numerous different work tools 15 may be attachable to a single machine 10 and controllable via operator station 14. Work tool 15 may include any device used to perform a particular task, such as a ripper, a bucket, a blade, a shovel, or any other task-performing device known in the art. Work tool 15 may be connected to machine 10 via a direct pivot, via a linkage system, via one or more hydraulic cylinders, via a motor, or in any other appropriate manner. Work tool 15 may pivot, rotate, slide, swing, lift, or move relative to machine 10 in any way known in the art.

Work tool 15 may be driven by engine 16. In one example, work tool 15 may include a hydraulic actuator, for example a cylinder or a motor, which receives high-pressure fluid from a pump 33 that is connected to and driven by engine 62. The high-pressure fluid may be used to provide an actuating force for work tool 15 as work tool 15 engages the earth. In this manner, the engage of work tool 15 may function to load engine 16 via pump 33.

Operator station 14 may be a location from which an operator controls machine 10. Operator station 14 may be located on or off machine 10, and include one or more operator input devices, such as input device 23 and input device 30. Operator input devices 23, 30 may be located proximal an operator seat and may or may not be associated with a console. Additional input devices (not shown) may be located within operator station 14, if desired, and embody, for example, single or multi-axis joysticks, wheels, knobs, push-pull devices, buttons, pedals, switches, and other input devices known in the art. Signals generated by the input devices of operator station 14 may be used to regulate operation of work tool 15, engine 16, and/or transmission 20.

A controller 34 may be associated with machine 10 and communicate with other components of machine 10 to affect a performance thereof. In particular, controller 34, together with sensors 22 and 32, input devices 23 and 30, and displacement mechanisms 28, may form a control system 36 that, as will be described in more detail below, may function to selectively reduce a speed of engine 16 and/or change a gear ratio of transmission 20 in response to operator input and sensed machine parameters.

Controller 34 may embody a single or multiple microprocessors, field programmable gate arrays (FPGAs), digital signal processors (DSPs), etc. that include a means for controlling an operation of engine 16 and/or transmission 20 in response to signals received from engine 16, sensors 22 and 32, input devices 23 and 30, displacement mechanisms 28, and other components of machine 10. Numerous commercially available microprocessors can be configured to perform the functions of controller 34. It should be appreciated that controller 34 could readily embody a microprocessor separate from that controlling other performance related power system functions, or that controller 34 could be integral with a general power system microprocessor and be capable of controlling numerous power system functions and modes of operation. If separate from the general power system microprocessor, controller 34 may communicate with the general power system microprocessor via datalinks or other methods. Various other known circuits may be associated with controller 34, including power supply circuitry, signal-conditioning circuitry, actuator driver circuitry (i.e., circuitry powering solenoids, motors, or piezo actuators), and communication circuitry.

It is considered that controller 34 may include one or more maps stored within an internal memory. Each of these maps may include a collection of data in the form of tables, graphs, and/or equations that may be used to correlate, among other things, fuel limits (e.g. a torque fuel limit, a smoke limit, etc.), different modes of operation (e.g., normal, first economy, second economy, etc.), travel directions (e.g., F, N, R), and transmission ratios with different desired engine speeds, travel speeds, torque ratios, and fuel settings. Each of these maps may be automatically selected for use by controller 34 or manually selected by an operator, and periodically updated based on performance of machine 10.

Each mode of operation selectable via input device 30 may correspond with a mapped set of conditions and limit values that may be used by controller 34 during regulation of machine 10. The conditions may be satisfied by comparing measured or simulated values to limit values via one or more predetermined algorithms. The limit values may be stored in the maps of controller 34 and/or may be supplied by the operator. The limit values may comprise, for example, a travel direction of machine 10, a travel speed of machine 10, a minimum and/or maximum allowable speed of engine 16, a current or available torque output of engine 16 (i.e., a current fuel setting or fuel limit), and a current, desired, and/or maximum gear ratio of transmission 20. The limit values may be used by controller 34 alone or in any combination.

Each selectable mode of operation may also correspond with setpoint values that controller 34 may use to regulate engine speed and/or a transmission gear ratio for the desired operating mode. For example, the setpoint values for the normal high-idle mode may correspond with a desired engine speed of about 2100 rpm. The setpoint values for the first and second economy modes may correspond with a desired engine speed of about 1600 rpm. The setpoint values that trigger automatic transition between modes of operation may be associated with torque thresholds, for example, a first torque threshold corresponding with a current engine torque (i.e., a current fuel setting) that is about 10% less than an available torque output (i.e., a torque limit fuel setting), and a second torque threshold corresponding with the current engine torque being about equal to 95% of the available torque. Additional setpoint values that trigger disengagement of or limit full use of the economy modes may be associated with a maximum allowable gear ratio of transmission 18, for example a gear ratio of about 1.6, and a corresponding travel speed, for example about 10 kph In response to input received via input device 30, controller 34 may change the operation of machine 10 from one mode of operation to another mode of operation (e.g., from normal high-idle mode to the first or second economy modes). Within each mode of operation, controller 34 may adjust speed settings of engine 16 and a gear ratio of transmission 20 based on monitored input, data from stored maps, internal algorithms, and stored setpoint values. Controller 34 may regulate the speed of engine 16 by, for example, reducing or increasing an available fuel and/or air inflow (i.e., changing the available potential energy) of engine 16. Modification in the gear ratio of transmission 20 may be achieved by, for example, selectively increasing or decreasing a displacement of pump 24 and/or motor 26 via displacement mechanisms 28. This regulation may allow controller 34 to efficiently respond to changing loads on machine 10, travel conditions, and desires of the machine's operator. Controller 34 may use any control algorithm, such as bang-bang control, proportional control, proportional integral derivative control, adaptive control, model-based control, logic-based control, and any other control method known in the art. Controller 34 may use feedforward and/or feedback control.

Figure 3:
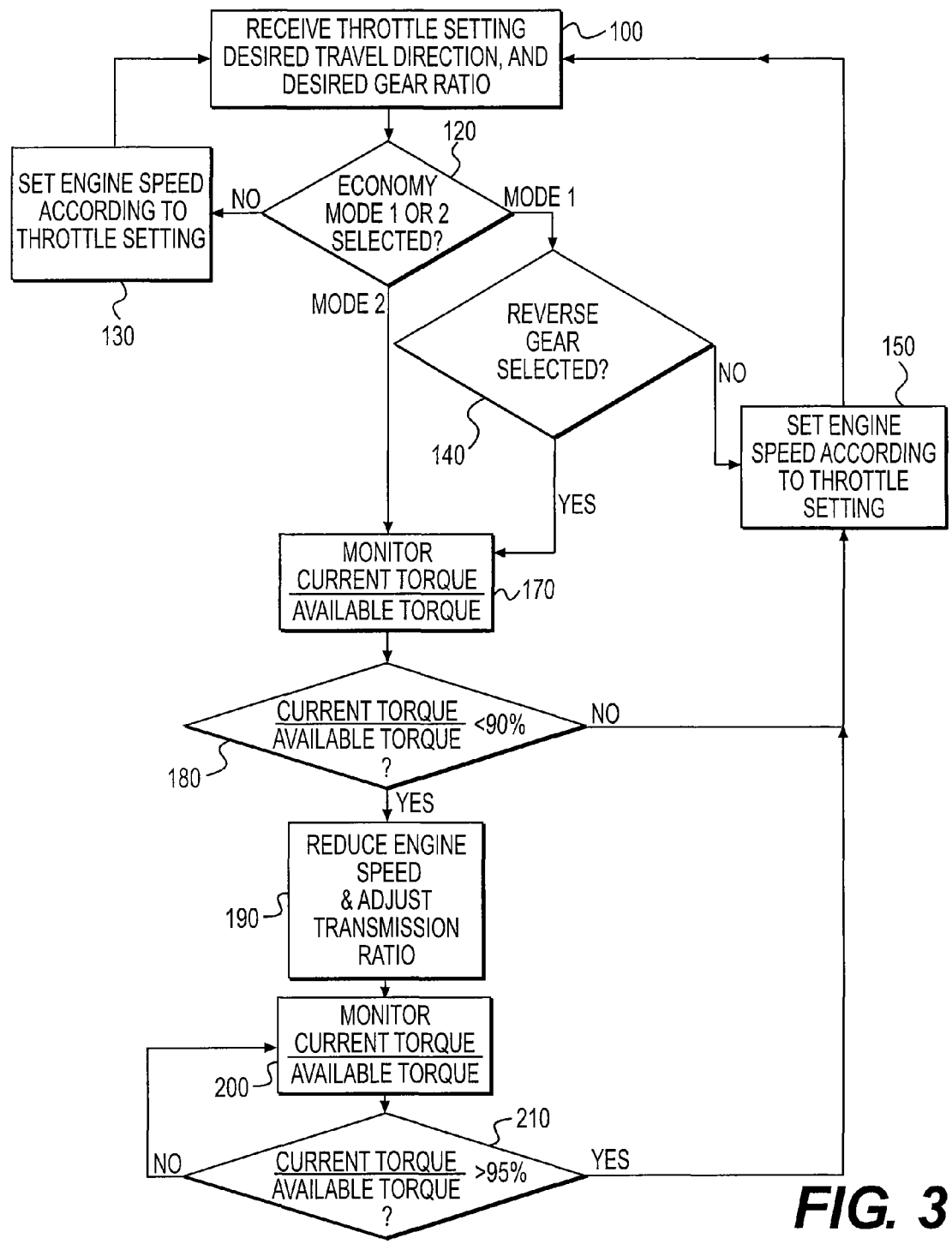
FIG. 3 is flowchart depicting an exemplary operation of the power system illustrated in FIG. 2.

FIG. 3 outlines an exemplary method of controlling machine 10 that may be implemented by controller 34. FIG. 3 will be discussed in detail below.

Industrial Applicability

The disclosed control system may be applicable to any machine where greater control of fuel consumption, exhaust emissions, engine temperatures, and engine noise is desired. Particularly, the disclosed control system may provide a plurality of selectable modes of operation, including two economy modes, where each mode differently affects the operation of an engine and an associated transmission. Further, the disclosed control system may automatically regulate the engine and the transmission based on machine loading and desired travel speeds. This adjustment according to machine loading and desired travel speed may provide an overall reduction in fuel consumption, exhaust emissions, engine temperature, and engine noise, without significantly affecting a responsiveness of the machine. Operation of machine 10 will now be described.

Machine 10 may be a high-idle machine and, as such, before beginning work with machine 10 requiring high-torque output, an operator may set a throttle position of machine 10 to high-idle speed. The operator may then select a desired travel direction of machine 10, including forward travel (F), reverse travel (R), or neutral (N), and a desired gear ratio in the selected travel direction. As described above, the throttle position of machine 10 may be set via input device 23, and the desired travel direction and gear ratio via input device 30. The desired throttle position and gear ratio, together, may define a desired travel speed of machine 10. Controller 34 may receive the throttle setting, desired travel direction, and desired gear ratio (Step 100), and then determine based on the received input which mode of high-idle operation has been selected by the operator (Step 120).

When the operator selects the normal mode of operation, controller 34 may set a current speed of engine 16 to the selected high-idle speed of 2100 rpm (Step 130), and return control to step 100. The operator may select the normal mode of operation for tasks where economy may be sacrificed in return for high responsiveness of machine 10. Controller 34 may remain in the normal mode until the operator selects a new mode of operation.

When the operator selects the first economy mode of operation (Step 120: Mode 1), controller 34 may communicate with input device 30 to receive data regarding the desired travel direction currently being requested by the operator. That is, controller 34 may determine if Forward, Neutral, or Reverse has been selected by the operator via input device 30 (Step 140). If the forward travel direction has been selected in conjunction with the first economy mode, controller 34 may set the current engine speed according to the selected throttle setting (Step 150), and return control to step 100.

If, however, controller 34 determines at step 120 that economy mode 1 and at step 140 that Reverse or Neutral were selected, controller 34 may monitor a ratio of current engine torque to available engine torque (Step 170). As described above, engine torque may be represented by a fuel amount at a given engine speed. Thus, the ratio of current engine torque to available engine torque may be about equal to a ratio of a current fuel setting to a torque fuel limit for a given speed of engine 16. Controller 34 may make a comparison of this torque ratio to a threshold ratio (Step 180), and determine based on the comparison if engine speed reduction can take place without significantly affecting machine responsiveness in a negative way. If the ratio of current engine torque to available engine torque at the current engine speed is greater than about 90% (i.e., if the amount of torque output of engine 10 is nearing the available torque output) (Step 180: No), then controller 34 may set the current engine speed according to the selected throttle setting without any reductions (Step 150). In this particular situation, a reduction in engine speed might result in an engine torque output that is insufficient to meet operator or machine demands and, accordingly, controller 34 may not reduce the current engine speed in this situation.

If, however, current engine torque is less than available engine torque by about 10% or more (Step 180: Yes), controller 34 may reduce the current speed of engine 16 away from the desired engine speed (i.e., away from the throttle setting of high-idle to about 1600 rpm), and adjust the ratio of transmission 20 to maintain the desired travel speed of machine 10 at the reduced engine speed (Step 190). For example, if the high-idle engine speed of 2100 rpm, in conjunction with the desired gear ratio, would have resulted in a machine travel speed of 2 kph in the reverse direction, when controller 34 reduces the current engine speed to 1600 rpm, controller 34 may also simultaneously increase the gear ratio of transmission 20 by a corresponding amount such that the resulting machine travel speed at the reduced engine speed is still 2 kph. In this manner, fuel efficiency, emissions, noise, etc. may be improved without negatively affecting machine performance, perhaps without the operator even noticing the change in engine speed. The operator may select the first economy mode of operation for tasks where reductions in fuel consumption, temperature noise etc. are desired, but where high performance is still required.

During operation in the first economy mode, it may be possible for the ratio of current engine torque to available engine torque to increase (i.e., for a current engine fuel setting to increase and near the torque fuel limit). For this reason, controller 34 may continue to monitor the ratio of current to available engine torque (Step 200) and selectively reset engine speed based on the comparison (Step 210). That is, during operation of machine 10 in the first economy mode, when the ratio of current to available engine torque reaches or exceeds about 95%, controller 34 may increase the speed of engine 16 from 1600 rpm to 2100 rpm. Alternatively, it is contemplated that the increase in engine speed due to rising torque values may be incremental and result in an engine speed less than high-idle. For example, the increase in reverse travel speed during the first economy mode may be an increase from 1600 rpm to only 1800 rpm when the ratio of current torque to available torque exceeds about 95%, and in some situations increase further to 2100 rpm as the ratio reaches about 100%.).

When the operator selects the second economy mode of operation (Step 120: Mode 2), control may advance directly to step 170 without checking to see if machine 10 is traveling in a reverse direction. That is, the engine speed reductions described above, from 2100 rpm to 1600 rpm may be implemented anytime the ratio of current to available torque is less than 90%, regardless of the travel direction of machine 10. The second economy mode of operation may be selected for maximum reductions in fuel consumption, noise, temperature, etc.

It is contemplated that the resetting of engine speed after step 210, in response to a rising ratio of current to available torque, may be different during the second economy mode and depending on the travel direction of machine 10, if desired. That is, when the ratio increases above 95% during forward travel of machine 10 in the second economy mode, the engine speed may be reset from 1600 rpm to the high-idle speed of 2100 rpm. However, during reverse travel of machine 10 in the second economy mode, the engine speed may be raised by a less amount in response to the rising torque ratio, for example from 1600 rpm to only 1800 rpm.

It is also contemplated that a maximum limit to the gear ratio of transmission 18 and/or the travel speed of machine 10 may be imposed during use of the economy modes. In particular, as the gear ratio of transmission 18 is increased to maintain a desired travel speed at a reduced engine speed, the gear ratio may eventually reach a threshold value. If the gear ratio of transmission 18 is increased beyond the threshold value, it may be possible for the gear ratio of transmission 18 and/or for the travel speed of machine 10 to increase beyond an acceptable limit. For this reason, the economy modes of operation may be limited to a maximum transmission gear ratio of about 1.6 and/or a maximum travel speed of about 10 kph.

In some situations, the maximum gear ratio/travel speed limit may result in little or no engine speed reduction during the first or second economy modes. For example, if machine 10 is traveling at 2100 rpm with a gear ratio of 1.4, to maintain the same travel speed at the reduced engine speed of 1600 rpm, the gear ratio would have to increase to about 1.84. However, because the transmission gear ratio may be limited to 1.6, the lowest speed that engine 16 could be reduced to would be about 1837 rpm. Accordingly, in this situation, controller 34 may still reduce the speed of engine 16 when the ratio of current to available torque falls below 90%, but the speed reduction amount may only be about 260 rpm.

In other situations, after the engine speed reduction at step 190, an operator may indicate a desire for increased travel speed of machine 10. In response to the desired increase in travel speed, controller 34 may increase the gear ratio of transmission 20 until the maximum gear ratio of transmission 20 is reached. Once the maximum gear ratio of transmission 20 is reached, and if the increase in desired travel speed is not yet attained, controller 34 may then begin to raise the speed of engine 10 away from 1600 rpm.

It is also contemplated that, in situations of communication malfunction, input other than torque ratio (i.e., ratio of current torque to available torque) may be utilized to control machine 10 during the economy modes of operation. For example, when the signal of current torque is not available, it may be possible to compare current engine speed to the desired engine speed and determine if the economy modes of operation should be implemented. That is, if set to the high-idle speed of 2100 rpm and engine 16 of machine 10 has lugged back to 1900 rpm, it can be determined that the corresponding torque ratio would be calculated at 100%. In this situation, the economy modes of operation may not be allowed.

Several advantages of the load-adjusted economy mode system may be realized. In particular, the disclosed system may provide a plurality of selectable modes of machine operation, and automatically modulate engine speed and transmission gear ratio when a load requires high-power during an economy mode. This combination of selectable economy modes and transmission adjustments may provide increased efficiency without causing a significant loss in machine responsiveness.

It will be apparent to those skilled in the art that various modifications and variations can be made to the disclosed control system without departing from the scope of the invention. Other embodiments of the control system will be apparent to those skilled in the art from consideration of the specification and practice of the control system disclosed herein. For example, it is contemplated that controller 34 may delay a time period following selection of a particular travel direction, before implementing engine speed reductions, if desired. It is intended that the specification and examples be considered as exemplary only, with a true scope being indicated by the following claims and their equivalents.

What is claimed is:

1. A control system for a mobile machine, comprising: an engine configured to propel the mobile machine;
   at least one operator input device configured to indicate a desired engine speed a desired mode of operation; and
   a controller in communication with the engine and the at least one operator input device, the controller being configured to:
   make a comparison of a current torque of the engine to an available torque; and
   selectively adjust a speed of the engine from the desired engine speed based on the desired mode of operation and based on the comparison only when a desired travel direction is a reverse travel direction.

2. The control system of claim 1, further including a transmission driven by the engine, wherein:
   the at least one operator input device is further configured to indicate a desired travel speed; and
   the controller is further configured to selectively adjust a ratio of the transmission to maintain the desired travel speed of the mobile machine after adjusting the speed of the engine.

3. The control system of claim 2, wherein the transmission is a continuously variable transmission, and the controller is configured to adjust the ratio of the transmission as the speed of the engine is being adjusted such that a current travel speed of the mobile machine remains about the same during adjustment of the speed of the engine.

4. The control system of claim 2, wherein the controller is further configured to make a second comparison of a current gear ratio of the transmission to a threshold gear ratio, and selectively inhibit operation in the desired mode based on the second comparison.

5. The control system of claim 1, where:
   the at least one operator input device is further configured to indicate the desired travel direction.

6. The control system of claim 1, wherein the controller is configured to selectively reduce the speed of the engine only when the desired travel direction is a reverse travel direction and the current torque of the engine is less than the available torque by at least a threshold amount.

7. The control system of claim 6, wherein the threshold amount is about 10% of the available torque.

8. The control system of claim 6, wherein the controller is further configured to selectively increase the speed of the engine to the desired engine speed when the current torque of the engine rises above a second threshold amount.

9. The control system of claim 8, wherein the second threshold amount is about 95% of the available torque.

10. A method of controlling a mobile machine, comprising:
    receiving by a controller input indicative of desired engine speed of the mobile machine and a desired mode of operation of the mobile machine;
    making a comparison by the controller of the current engine torque of the mobile machine to an available torque; and
    selectively adjusting by the controller an engine speed of the mobile machine from the desired engine speed based on the desired mode of operation and based on the comparison only when a desired travel direction is a reverse travel direction.

11. The method of claim 10, further including: receiving input indicative of a desired travel speed; and
    selectively adjusting a transmission ratio of the mobile machine to maintain the desired travel speed after adjustment in the engine speed.

12. The method of claim 10, wherein adjusting a transmission ratio includes continuously adjusting the transmission ratio as the engine speed is adjusted such that a travel speed of the mobile machine remains about the same during the adjusting.

13. The method of claim 10, further including receiving input indicative of the desired travel direction.

14. The method of claim 10, further including delaying a period of time after receiving input indicative of desired travel in a reverse direction before adjusting the engine speed.

15. The method of claim 10, wherein selectively adjusting the engine speed of the mobile machine from the desired engine speed includes reducing the engine speed only when the desired travel direction is a reverse travel direction and the current engine torque is less than the available torque by at least a threshold amount.

16. The method of claim 15, wherein the threshold amount is about 10% of the available torque.

17. The method of claim 15, further including increasing the engine speed to the desired engine speed when the current engine torque rises above about 95% of the available torque.

18. A machine, comprising: a traction device; an engine configured to generate a power output;
    a continuously variable transmission configured to transmit the power output from the engine to the traction device at a range of transmission ratios;
    at least one operator input device configured to indicate a desired engine speed, a desired travel speed, a desired travel direction, and a desired mode of engine operation; and
    a controller in communication with the engine, the at least one operator input device and the continuously variable transmission, the controller being configured to:
    compare a current torque of the engine to an available torque;
    selectively reduce a speed of the engine from the desired engine speed based on the desired mode of operation when the current torque is less than the available torque by about 10% and only when the desired travel direction is reverse;

selectively increase a speed of the engine to the desired engine speed when the current torque rises above about 95% of the available torque; and selectively adjust a ratio of the continuously variable transmission to maintain the desired travel speed of the machine during the reduction in speed of the engine.

* * * * *